United States Patent Office

3,583,959
Patented June 8, 1971

3,583,959
HEAT-STABLE VINYL CHLORIDE-ACETATE RESINS PREPARED IN THE PRESENCE OF OLEFINS
Ping Kang Shen, Leominster, and Eugene Norman Skiest, Worcester, Mass., assignors to Borden Inc., New York, N.Y.
No Drawing. Filed Oct. 31, 1968, Ser. No. 772,394
Int. Cl. C08f 15/24
U.S. Cl. 260—87.1                6 Claims

ABSTRACT OF THE DISCLOSURE

This invention relates to vinyl chloride-acetate resins with improved stability under long exposure to heat as evidenced by slower rate of darkening and reduced tendency to "puff," and to the means of making said improved resins which comprises suspension-polymerizing vinyl chloride and vinyl acetate in the presence of effective amounts of a conditioning agent selected from the group consisting of normal straight chain alpha olefins having at least six atoms.

BACKGROUND OF THE INVENTION

Copolymer resins of vinyl chloride with vinyl acetate, particularly with vinyl acetate content in the range of about 12 to 16 percent by weight, are commonly used in the manufacture of phonograph records, floor tile and various types of rigid sheet and injection moldings. Difficulties encountered in these applications arise from the inherent instability of these resins on continued exposure to the heat of processing, as evidenced by a rapid rate of darkening first to yellow, then to black, and by a tendency to exhibit a behavior known in the trade as "puffing" whereby the resin becomes filled and expanded with tiny bubbles of gases formed by decomposition. "Puffing" not only results in poor appearance, but in the case of such applications as phonograph records must be completely avoided in order to achieve superior quality of performance. Because of these difficulties, it is required to operate as quickly as possible and at lower temperatures than desirable for purposes of economy.

Some alleviation of the heat-stability problem is possible by the use of various metallic compounds, in particular stabilizers which are compounds of barium and cadmium. However, the concentrations of these materials which may be used is limited by their cost and by the changes in chemical and mechanical properties, which take place at higher levels of concentration, leading to serious defects in the performance of the end-product such as in the audio irregularities of phonograph records or in their optical appearance. Improvements have also been reported as resulting from special treatments with chlorinating agents in the presence of oxygen, but these treatments are both time-consuming and uneconomical.

An object of this invention is to make possible the use of smaller amounts of metallic stabilizer to attain a desired level of heat stabilization, thereby saving appreciable cost.

A further object of this invention is to make a vinyl chloride-acetate resin so much less sensitive to the heat of shear that the extrusion screw speed may be increased, again with resulting savings in cost.

Again, another object is to make possible the re-use of scrapping, thus effecting further economy.

SUMMARY OF THE INVENTION

A means has now been found whereby the tendency of vinyl chloride-acetate resins to darken and "puff" on exposure to heat is substantially curtailed, making possible considerable economies by using less stabilizer, by using increased extrusion speeds and by re-using scraps.

Briefly stated, the present invention comprises the suspension-polymerization of vinyl chloride and vinyl acetate in the presence of effective amounts of a conditioning agent selected from the group consisting of normal straight chain alpha olefins having at least 6 atoms.

DETAILED DESCRIPTION OF THE INVENTION

The method of this invention may be carried out using any of the procedures of suspension co-polymerization of vinyl chloride and vinyl acetate known to those skilled in the art. Such procedures comprise the presence of a suspending agent, an oil-soluble free radical initiator and, suitably, also various other auxiliary ingredients which may include buffers, surfactants and chain transfer agents.

The essence of the instant invention comprises including in the polymerization procedure a normal alpha olefin present in an amount from about 0.5% to about 4% based on the weight of the total monomer. Reaction temperature can vary from about 85° F. to about 185° F., depending upon the pressure and also upon the amounts of initiator and other factors well-known to those skilled in the art. The reaction time will vary from about 5 to about 20 hours to reach completion.

The vinyl chloride-acetate copolymer resins of this invention may vary in composition, expressed in weight ratio of vinyl chloride to vinyl acetate, in the range from about 80/20 to about 95/5.

As to materials, any normal alpha olefin having at least 6 carbon atoms and no more than 22 carbon atoms, may be used, with the $C_6$-$C_{10}$ olefins being preferred. When it is attempted to use olefins with less than 6 carbons such as when butene-1 or butene-2 are used, polymerization rate is seriously hindered and the reaction is not carried to completion. For the same reason, branched olefins such as 3-methyl butene-1, 3-methyl hexene-1, 2-methyl butene-1, 2,4,4-trimethyl pentene-1, 2-methyl pentene-1 and 2,4,4-trimethyl pentene-2 are unsatisfactory. Among the alpha olefins which are applicable are octene-1, hexene-1, decene-1, octadecene-1, hexadecene-1, dodecene-1, tetradecene-1, eicosene-1, and the like. Hexene-1, octene-1 and hexadecene-1 are preferred.

The alpha olefin and the vinyl chloride and the vinyl acetate monomers may be added continuously or in slugs during the polymerization process or they may be added, singly or in combination, all or in part at the beginning of the reaction. It is preferred, however, to add the alpha olefin and a portion of the vinyl acetate and vinyl chloride monomers initially and the remaining monomers in a slugwise manner.

The oil-soluble free radical donating initiator may be selected from diisopropylperoxy dicarbonate, lauroyl peroxide, benzoyl peroxide, di-chlorobenzoyl peroxide, acetyl cyclohexane sulfonyl peroxide, and the like, as well as combinations of initiators herewith set forth, such as diisopropylperoxy dicarbonate with lauroyl peroxide. The initiator is usually employed in an amount of from about 0.03% to about 2.0%, based on the weight of total monomer.

A suspending agent may be chosen from carboxymethyl cellulose, hydroxyethyl cellulose, polyvinyl alcohol, gelatin, casein and the like in an amount of from about 0.05% to about 2.0%, based on the weight of total monomer.

A surfactant may also be included in the process of this invention. Among the ionic or non-ionic surfactants which may be used in an amount of from about 0.005% to about 0.10%, based on the weight of total monomer, are alkylaryl sulfates, sulfates of fatty alcohols, sulfates of ethoxylated alcohols, esters of alcohols and glycols, polyoxyethylene alcohols and the like. Such surfactants are well-known in the art, and the invention is not to be construed as limited to the surfactant used.

When a buffer is used, this may be for example sodium bicarbonate, sodium acetate, or sodium dihydrogen phosphate in an amount of between 0.05% to about 1.0%, based on the weight of total monomer. Chain transfer agents which may be used, usually in an amount between about 0.1% and about 2.0% based on total monomer, include carbon tetrachloride, trichloroethylene, toluene and the like.

The initiators, suspending agents, surfactants, buffers, chain transfer agents and other ancillary agents used for vinyl chloride suspension polymerization are well-known in the art and the invention is not to be construed as limited to those disclosed for the purpose of illustration.

The invention will be further described in connection with the following examples of the practice of it which are set forth for the purpose of illustration only and wherein proportions are in parts by weight unless specifically stated to the contrary.

EXAMPLE 1

(a) A vinyl chloride acetate resin modified according to the method of the instant invention was prepared by suspension polymerizing 642 lbs. of vinyl chloride and 72.5 lbs. of vinyl acetate in the presence of 1,666 lbs. of water, 11 lbs. of hexene-1 as conditioning agent, 1.3 lbs. of the 1 to 1 polymer of methyl vinyl ether and maleic anhydride as suspending agent, 73 lbs. of diisopropylperoxy dicarbonate as initiator, 3.6 lbs. of sodium acetate as buffer and 3.6 lbs. of trichloroethylene as chain transfer agent. The temperature of reaction was about 140° F. After 6 hours of reaction the polymerization was stopped at 70 p.s.i. and the resin was filtered, dried, and recovered. The relative viscosity of resin as measured in 1% solution in cyclohexanone was 1.59.

(b) For purposes of comparison a corresponding vinyl chloride acetate resin was made without the conditioning agent of this invention. 638 lbs. of vinyl chloride and 87 lbs. of vinyl acetate were polymerized in the presence of 1,666 lbs. of water, 1.8 lbs. of the 1 to 1 copolymer of methyl vinyl ether and maleic anhydride as suspending agent, 5.4 lbs. of sodium acetate and 5.8 lbs. of trichloroethylene as chain transfer agent. The temperature of reaction was about 146° F. After 9.5 hours of reaction the polymerization was stopped at 20 p.s.i. The resin was filtered, dried, and recovered. It was found to have a relative viscosity at 1% in cyclohexanone of 1.62.

(c) The resins of Examples 1(a) and (b) were respectively milled in the proportions of 98.5 parts of resin to 1.5 parts of a barium-cadmium stabilizer available commercially as Ferro BJ-2. Milling was carried out at 300° F. for 3 minutes. Subsequently, the respective milled samples were placed in an oven at 325° F. and observed at periodic intervals. The observations are summarized in Table I.

TABLE I

| Minutes in oven at 325° F. | Color of resin | |
|---|---|---|
| | Ex. 1(a) | Ex. 1(b) |
| 0 | White | White. |
| 10 | Br. yellow | Dark yellow. |
| 15 | Brown | Black. |
| 20 | do | Do. |
| 25 | do | Do. |
| 30 | do | Do. |
| 35 | Dark brown | Do. |

The results show that the resin of this invention has significantly higher resistance to discoloration under exposure to 325° F.

EXAMPLE 2

The resin of Example 1(a) was compared against a commercial vinyl chloride acetate resin containing 85% by weight vinyl chloride and 15% vinyl acetate and having a relative viscosity of 1.56. The respective resins were formulated with Ferro BJ-2 in the same proportions as given in Example 1(c), milling at 280° F. for 3 minutes. The milled samples were placed in an oven at 325° F. Visual observations of the respective resins after increasing intervals of oven exposure are summarized in Table II.

TABLE II

| Minutes in oven at 325° F. | Resin of Example 1(a) | | Commercial resin of prior art | |
|---|---|---|---|---|
| | Color | Puff | Color | Puff |
| 0 | Clear | None | Clear | None. |
| 10 | Yellow | do | Yellow | Do. |
| 20 | do | do | Black | Slight. |
| 30 | do | do | do | Bad. |
| 40 | do | do | do | Do. |
| 50 | Black | do | do | Very bad. |
| 60 | do | Slight | do | Do. |

While the standard resin started to turn black at 20 minutes, the resin of this invention only yellowed slightly and did not become black until after 50 minutes exposure to heat. Furthermore, the standard resin had puffed off very badly at the end of 30 minutes, whereas the resin of Example 1(a) did not show evidence of puffing until after 60 minutes at which time the puffing was only slight.

EXAMPLE 3

The resin of Example 1(a) and a commercial 85/15 vinyl chloride acetate resin were respectively formulated in the proportions 83.5 parts resin, 15 parts of a 93/7 vinyl chloride/vinyl acetate copolymer as available commercially and 1.5 parts of Ferro BJ-2. The respective samples were tested in a Brabender dynamic rheometer operated at 149° C. with rotar at 63 r.p.m. It was found that the formulation which did not contain the resin of this invention maintained a stable torque for only about 11 minutes. In contrast to this, the corresponding formulation containing the resin of this invention maintained a stable torque over a period of greater than 24 minutes showing that the resin of this invention could withstand the effects of shear for more than twice as long as a resin of the prior art without undergoing decomposition.

While this invention has been described in terms of certain preferred embodiments and illustrated by means of specific examples, the invention is not to be construed as limited except as set forth in the following claims.

What is claimed is:

1. A process for the manufacture of an article made from a vinyl chloride vinyl acetate containing resin, which process comprises forming a suspension of monomers of vinyl chloride, vinyl acetate and a normal straight chain alpha-olefin selected from the group consisting of olefins having from 6–22 carbons, said resin having a weight ratio of vinyl chloride to vinyl acetate in the range of about 80/20 to about 95/5, said olefin being present in an amount of about 0.5% to about 4% based on the weight of total monomer, reacting said monomers at a temperature of from about 85° F. to about 185° F. for a time sufficient to effect substantially complete polymerization, recovering and drying the polymerizate, processing said polymerizate at a temperature up to 325° for a period up to one hour to form said article, said article being stabilized against discoloration or puffing.

2. The process of claim 1, wherein the olefin is selected from the group of olefins having between about 6 to 10 carbons.

3. The process of claim 1, wherein the article is a member selected from the group consisting of phonograph records, floor tile, rigid sheet and injection moldings.

4. The method of claim 1 wherein the conditioning agent is octene-1.

5. The method of claim 1 wherein the conditioning agent is decene-1.

6. The method of claim 1 wherein the conditioning agent is hexene-1.

References Cited

UNITED STATES PATENTS

| | | | |
|---|---|---|---|
| 3,172,877 | 3/1965 | Fishbein | 260—87.1 |
| 3,296,230 | 1/1967 | Gateff | 260—87.1 |

FOREIGN PATENTS

| | | | |
|---|---|---|---|
| 1,128,580 | 9/1968 | Great Britain | 260—80.81 |

JOSEPH L. SCHOFER, Primary Examiner

C. A. HENDERSON, Jr., Assistant Examiner

U.S. Cl. X.R.

260—45.7, 80.81, 92.8